United States Patent
Hirosawa et al.

(10) Patent No.: US 7,621,643 B2
(45) Date of Patent: Nov. 24, 2009

(54) PROJECTION APPARATUS, CEILING HANGING HARDWARE FOR PROJECTION APPARATUS, AND METHOD OF CONTROLLING OPERATION OF PROJECTION APPARATUS

(75) Inventors: Shigeru Hirosawa, Fussa (JP); Hideaki Masuo, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 400 days.

(21) Appl. No.: 11/375,278

(22) Filed: Mar. 14, 2006

(65) Prior Publication Data

US 2006/0209267 A1    Sep. 21, 2006

(30) Foreign Application Priority Data

Mar. 17, 2005   (JP) .............................. 2005-077243

(51) Int. Cl.
G03B 21/26 (2006.01)
G03B 21/16 (2006.01)
G03B 21/14 (2006.01)

(52) U.S. Cl. .............................. 353/58; 353/60; 353/61; 353/121; 353/119

(58) Field of Classification Search .................. 353/58, 353/60–61, 52, 121, 119, 122
See application file for complete search history.

(56) References Cited

U.S. PATENT DOCUMENTS

2005/0001988 A1 *   1/2005   Sample et al. ................. 353/52
2006/0072080 A1 *   4/2006   Perkins et al. ............... 353/119

FOREIGN PATENT DOCUMENTS

| JP | 4-6038 U | | 1/1992 |
|---|---|---|---|
| JP | 09130713 A | * | 5/1997 |
| JP | 9-166964 A | | 6/1997 |
| JP | 63-157227 U | | 10/1998 |
| JP | 2003-29764 A | * | 1/2003 |
| JP | 2004-184768 A | | 7/2004 |

OTHER PUBLICATIONS

Japanese Office Action dated Mar. 17, 2009 (2 pages), and English translation thereof (2 pages), issued in counterpart Japanese Application Serial No. 2005-077243.

* cited by examiner

*Primary Examiner*—Diane I Lee
*Assistant Examiner*—Magda Cruz
(74) *Attorney, Agent, or Firm*—Frishauf, Holtz, Goodman & Chick, P.C.

(57) ABSTRACT

A projection apparatus includes a projector including a cooling fan which cools the inside of a main unit through an air hole provided in the main unit and ceiling hanging hardware including a bracket having an external cooling fan which faces the air hole and whose air-flow direction coincides with that of the air hole. The projector is mounted on the ceiling hanging hardware while hanging from the ceiling hanging hardware.

7 Claims, 5 Drawing Sheets

PROJECTION APPARATUS, CEILING HANGING HARDWARE FOR PROJECTION APPARATUS, AND METHOD OF CONTROLLING OPERATION OF PROJECTION APPARATUS

CROSS-REFERENCE TO RELATED APPLICATIONS

This application is based upon and claims the benefit of priority from prior Japanese Patent Application No. 2005-077243, filed Mar. 17, 2005, the entire contents of which are incorporated herein by reference.

BACKGROUND OF THE INVENTION

1. Field of the Invention

The present invention specifically relates to a projection apparatus favorable for a projector fixed on a ceiling or the like, ceiling hanging hardware for the projection apparatus, and a method of controlling operation of the projection apparatus.

2. Description of the Related Art

There is proposed a ceiling-hanging type liquid crystal projector that is capable of finely adjusting the position of a projection area for projecting a video image onto a screen, while the projector is hanging. Such a projector is disclosed in, for example, Jpn. Pat. Appln. KOKAI Publication No. 9-166964.

The following method including the technique of the above Publication is widely executed particularly among audio/video fans. They have a movie theater in their home and fix a projector on the ceiling of the theater by ceiling hanging hardware to project a video image onto a large-sized screen.

The temperature of an area close to the ceiling is generally the highest, and the projector itself includes a lamp such as a high-pressure mercury lamp, which generates a very high heat, as a light source. It is thus essential to cool the projector positively. The area close to the ceiling is by no means good environment for the projector, which is very likely to break the expensive lamp.

In order to resolve the above drawback, air can be circulated in the room by the use of an elevated electric fan, an air circulator or a ceiling fan. However, these devices blow air at a distance from the projector and their mechanisms are complicated. As compared with the complicated mechanisms, the devices seem to produce little cooling effect on the projector. A user has to judge the conditions of the projector at any time and operate the devices appropriately. The user's burden increases accordingly.

BRIEF SUMMARY OF THE INVENTION

According to a first aspect of the present invention, there is provided a projection apparatus comprising a main unit including a cooling fan which cools an inside of a casing through an air hole provided in the casing, and ceiling hanging hardware having an external cooling fan which faces the air hole and whose air-flow direction coincides with that of the air hole, the main unit being mounted on the ceiling hanging hardware while hanging from the ceiling hanging hardware.

According to a second aspect of the present invention, there is provided ceiling hanging hardware for a projection apparatus including a cooling fan which cools an inside of a main unit through an air hole provided in the main unit, the ceiling hanging hardware comprising an external cooling fan which faces the air hole and whose air-flow direction coincides with that of the air hole, the main unit being mounted on the ceiling hanging hardware while hanging from the ceiling hanging hardware.

According to a third aspect of the present invention, there is provided a method of controlling an operation of a projection apparatus, comprising controlling an operation of an external cooling fan of ceiling hanging hardware on which a main unit is mounted while hanging from the ceiling hanging hardware, by a signal supplied from inside of the main unit, the external cooling fan facing the air hole, and an air-flow direction thereof coinciding with that of the air hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A projector according to a first embodiment of the present invention will be described with reference to the accompanying drawings.

Figure 1A:
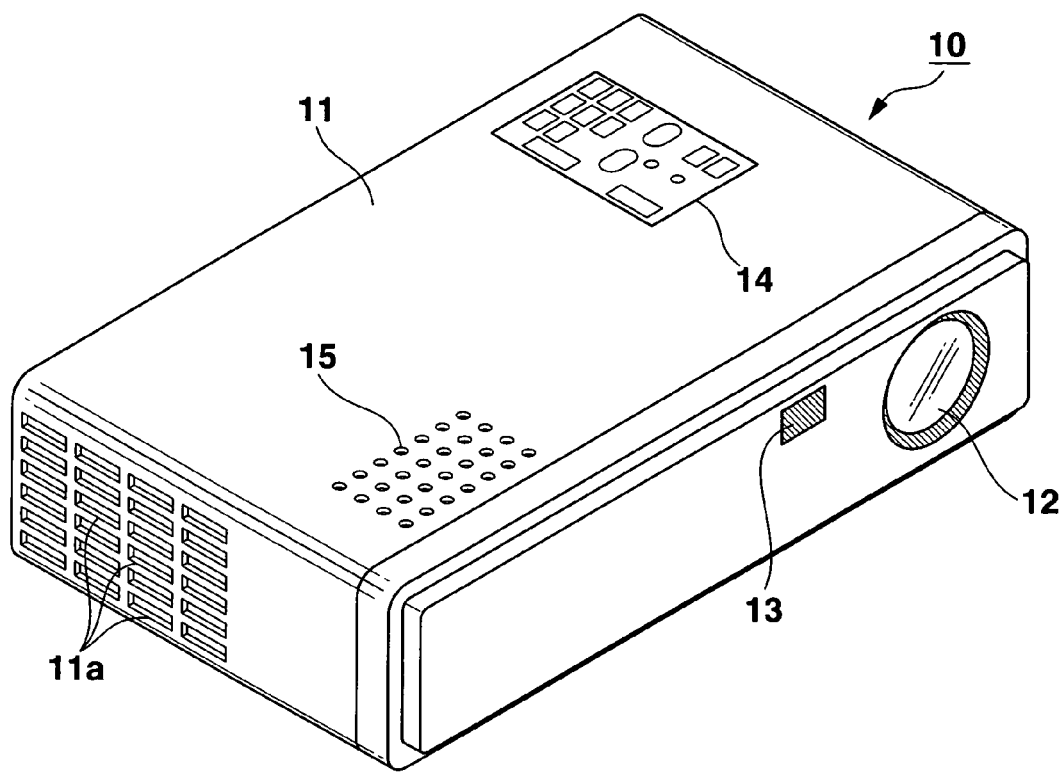
FIGS. 1A and 1B are perspective views showing an outward appearance of a projector according to a first embodiment of the present invention.
Figure 1B:
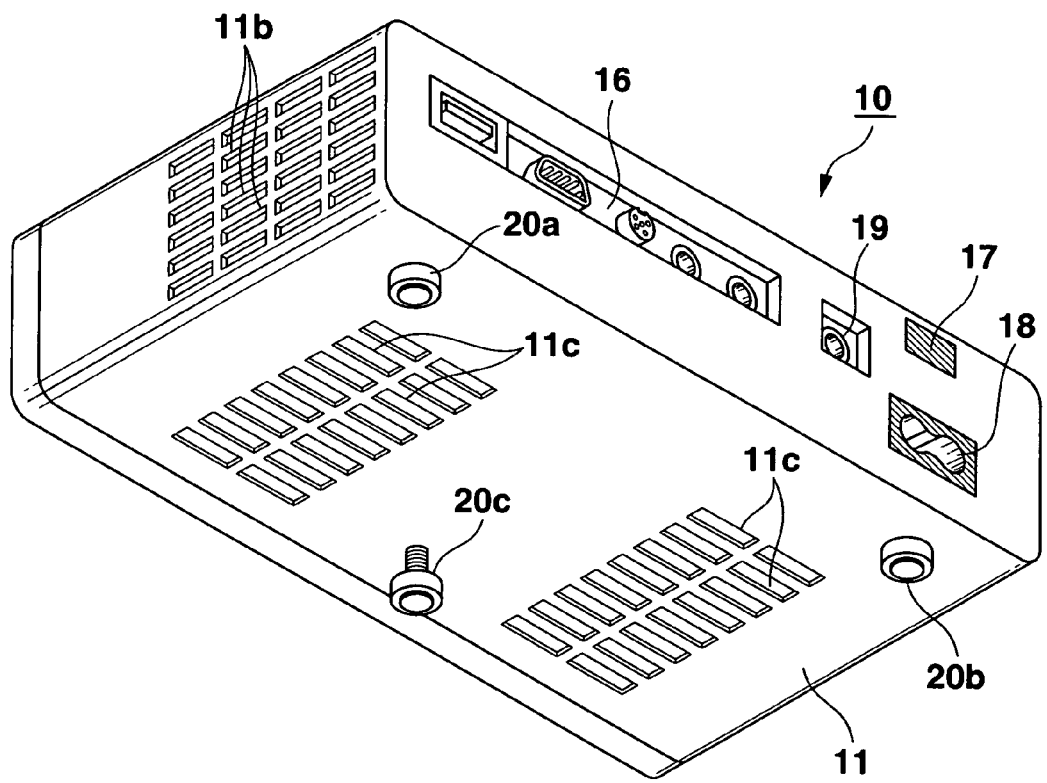

FIGS. 1A and 1B illustrate an outward appearance of a projector 10 (main unit) according to the first embodiment. FIG. 1A chiefly shows the front and top of a casing 11 of the projector, and FIG. 1B shows the back and bottom of the casing 11. The casing 11 is a substantially rectangular parallelepiped.

Referring to FIG. 1A, a projection lens 12 and an infrared (Ir) light-receiving unit 13 are provided on the front of the casing 11.

The projection lens 12 projects an optical image, which is formed by a spatial optical modulator such as a micro mirror device (described later), onto a screen or the like. Assume here that a focal position and a zoom position (angle of view for projection) can be varied freely.

The Ir light-receiving unit 13 receives an infrared light (Ir) signal on which a key operation signal is superimposed from a remote controller (not shown) of the projector 10.

A key switch unit 14 and a speaker 15 are arranged on the top of the casing 11. The key switch unit 14 includes a power key, an automatic focus/automatic keystone correction (AF/AK) key, a zoom up/down key, a signal selection key, a volume up/down key and a cursor key. The speaker 15 loudly sounds out an input speech signal and a beep during the operation.

Referring to FIG. 1B, an I/O connection unit 16, an Ir light-receiving unit 17, an AC adapter connection unit 18 and an external fan connection unit 19 are provided on the back of the casing 11.

The I/O connection unit 16 includes a USB terminal for connection with an external device such as a personal computer, a mini D-SUB terminal, an S terminal and an RCA terminal for inputting video images, and a stereo mini terminal for inputting speech. Like the Ir light-receiving unit 13, the Ir light-receiving unit 17 receives an infrared light (Ir) signal on which a key operation signal is superimposed from the remote controller (not shown). The AC adapter connection unit 18 is connected to an AC cable of an AC adapter (not shown) serving as a power supply. The external fan connection unit 19 is connected to an external cooling fan of ceiling hanging hardware (described later) to control the operations of the cooling fan.

Two length-adjustable legs 20a and 20b are attached to the bottom of the casing 11 and located close to both sides and the rear end thereof, and one length-adjustable leg 20c is attached to the bottom of the casing 11 and located in the middle of the front end thereof, as shown in FIG. 1B. These legs 20a to 20c are replaced with fixed-length fittings when the ceiling hanging hardware is mounted on the projection apparatus.

As illustrated in FIGS. 1A and 1B, a plurality of air holes 11a, 11b and 11c are formed in the left side, right side and bottom of the casing 11, respectively. The air holes function as air intakes or air outlets in accordance with the operations of a plurality of cooling fans (not shown) provided in the casing 11.

The functional units of an electronic circuit of the above projector 10 will be described with reference to FIG. 2.

Figure 2:
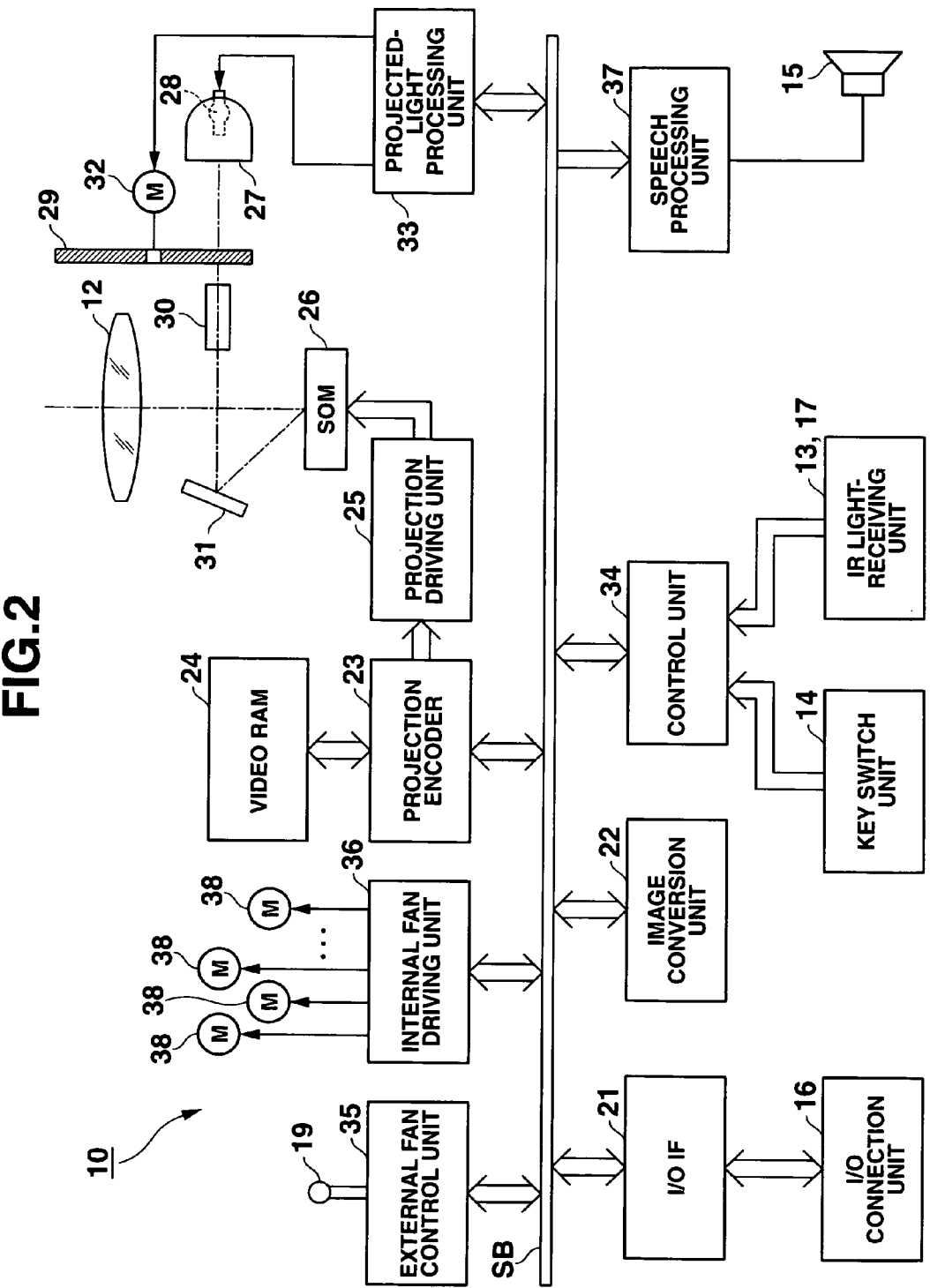
FIG. 2 is a block diagram of functional units of an electronic circuit of the projector according to the first embodiment of the present invention.

Referring to FIG. 2, various types of image signals are supplied from the I/O connection unit 16 to an image conversion unit 22 via an input/output interface (IF) 21 and a system bus SB. The image conversion unit 22 converts the signals into an image signal of a given format and then sends it to a projection encoder 23.

The projection encoder 23 stores the image signal in a video RAM 24 and then generates a video signal from the contents stored in the video RAM 24. The video signal is output to a projection driving unit 25.

The projection driving unit 25 drives a spatial optical modulator (SOM) 26, such as a micro mirror device, by higher-speed time division that is obtained by multiplying a frame rate such as 60 frame/seconds, the number of divisions of color components, and the number of display tones together appropriately in response to the image signal.

A light source lamp 28 of high-pressure mercury is provided in a reflector 27. The lamp 28 emits white light of high luminance to the spatial optical modulator 26. The white light is colored with a primary color through a color wheel 29, and its luminance distribution is uniformed by an integrator 30. The light is reflected by a mirror 31 to be formed as an optical image, and projected and displayed on a screen (not shown) through the projection lens 12.

A projected-light processing unit 33 performs both the lighting operation of the light source lamp 28 and the rotation operation of a motor (M) 32 for rotating the color wheel 29.

It is a control unit 34 that controls the operations of all of the units described above. The control unit 34 includes a CPU, a work memory, and a nonvolatile memory that stores operation programs including a projecting operation and an imaging operation (both described later) and executed by the CPU.

An external fan control unit 35, an internal fan driving unit 36 and a speech processing unit 37 are connected to the control unit 34 via the system bus SB.

The external fan control unit 35 controls the operations of a plurality of external cooling fans provided in the ceiling hanging hardware connected thereto via the external fan connection unit 19. Though not shown, the external fan connection unit 19 and the external cooling fans are electrically connected by cords or the like. If the ceiling hanging hardware is provided with a temperature sensor, the control unit 35 receives a sensing signal from the temperature sensor and notifies the control unit 34 of the sensing signal. The temperature sensor is also electrically connected to the external fan connection unit 19 by cords or the like.

The internal fan driving unit 36 drives a plurality of cooling fans 38 that are opposed to the air holes 11a, 11b and 11c in the projector 10 chiefly to cool the light source lamp 28, which is a heating source particularly in the projector 10.

The speech processing unit 37 includes a sound source circuit such as a PCM sound source. The unit 37 receives speech data during the projecting operation and converts it into analog data, thereby loudly sounding it out through the speaker 15 or generating a beep when necessary.

The control unit 34 receives key operation signals directly from the key switch unit 14 and signals directly from the Ir light-receiving units 13 and 17.

Figure 3:
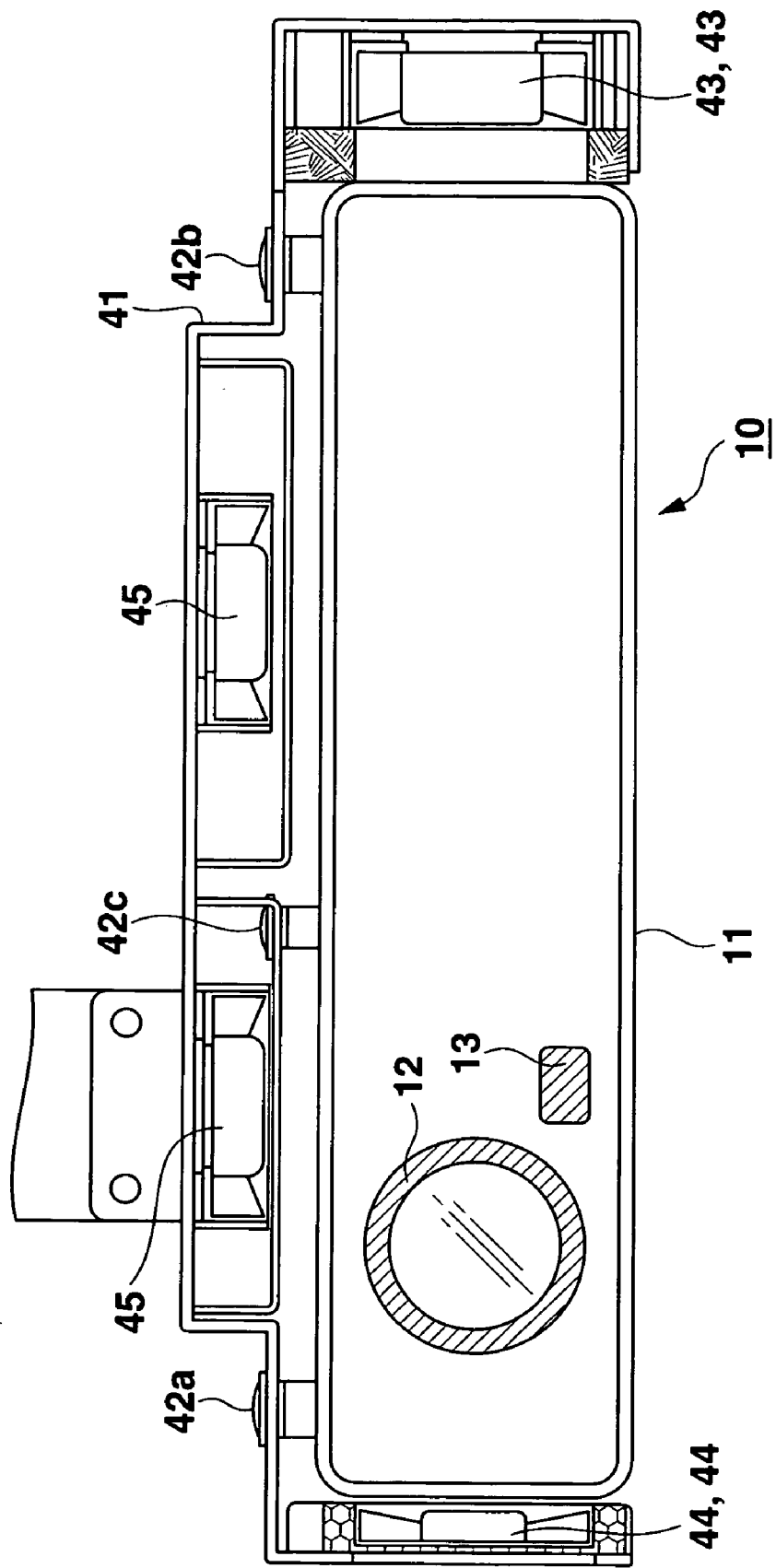
FIG. 3 is a front view of the projector according to the first embodiment of the present invention, which is mounted on ceiling hanging hardware.

FIG. 3 shows the projector 10 that is mounted on the ceiling hanging hardware to fix the projector on a ceiling or the like. Referring to FIG. 3, a bracket 41 is the principal component of the ceiling hanging hardware and has a virtually U-shaped section so as to match the bottom and both sides of the projector 10. As is apparent from FIG. 3, the projector 10 is fixed top side down with the bottom having air hole 11c opposed to the ceiling.

When the projector 10 is mounted on the bracket 41, fixed-length metal fittings 42a to 42c are used in place of the length-adjustable legs 20a to 20c of the bottom of the projector 10. Specifically, the metal fittings 42a to 42c are each formed of a countersunk screw and a cylindrical spacer. The countersunk screw is inserted into a through hole (not shown) formed in the bracket 41 from the opposite side of the fixing side of the projector 10. The countersunk screw is then fitted and fastened into a screw hole for each of the length-adjustable legs 20a to 20c through the cylindrical spacer. The projector 10 is therefore firmly supported by the bracket 41.

The structure of a base for fixing the bracket 41 on a ceiling or the like and the structure of a rotating mechanism, which is attached integrally with the bracket 41, for connecting the base and the bracket 41 and controlling the projection direction of the projector 10, are the same as that of commonly-used ceiling hanging hardware; therefore, their drawings and descriptions are omitted.

External cooling fans 43, 43; 44, 44; and 45, 45 are provided opposite to the air holes 11a, 11b and 11c, respectively. These external cooling fans are arranged close to and opposite to the cooling fans 38 (not shown in FIG. 3) with the air holes 11a to 11c interposed therebetween. The external cooling fans are so arranged that their intake and outlet directions coincide with those of the cooling fans 38.

With the above configuration, the projector 10 is fixed on the ceiling of a room by ceiling hanging hardware including the bracket 41, and wires for power supplies and image signals are connected to perform a projecting operation. In this case, before the control unit 34 causes the projected-light processing unit 33 to perform the lighting operation of the light source lamp 28, the internal fan driving unit 36 rotates the cooling fans 38 chiefly to cool the light source lamp 28 particularly in the projector 10.

Assume here that the control unit 34 operates the internal and external fans in association with each other at the same time when the cooling fans 38 are rotated. The operation switch of the ceiling hanging hardware, which is connected to the external fan connection unit 19 via the external fan control unit 35, is turned on to rotate the external cooling fans 43, 43; 44, 44; and 45, 45 at once.

As described above, the intake and outlet directions of the external cooling fans 43, 43; 44, 44; and 45, 45 and their facing cooling fans 38 have the same intake and outlet directions. The intake and outlet efficiency is improved to increase the amount of cooled air more greatly than the amount of air cooled only by the cooling fans 38.

In a room particularly in winter, a heating appliance is used and thus the air temperature of space near the ceiling becomes high. The projector 10 fixed on the ceiling by the ceiling hanging hardware has to be cooled with efficiency. In this case, too, the cooling fans 38 in the projector 10 and the external cooling fans 43, 43; 44, 44; and 45, 45 in the bracket 41 can be operated in association with each other to increase the amount of air flowing through the projector 10 greatly. Therefore, the inside of the projector 10 can be cooled sufficiently.

In addition, the operations of the external cooling fans 43, 43; 44, 44; and 45, 45 are controlled in response to a signal from the external fan control unit 35 in the projector 10. Since a user need not particularly pay attention to the operations of the external cooling fans, his or her burden of handling the projector 10 can be reduced.

Sine the external cooling fans 43, 43; 44, 44; and 45, 45 are associated with the cooling fans 38 in the projector 10, the operation control of the external cooling fans can be simplified to reduce the burden of both the control unit 34 and the external fan control unit 35 that is operated under the control unit 34.

Second Embodiment

A projector according to a second embodiment of the present invention will be described with reference to FIG. 4.

The outward appearance of the projector is basically the same as that of the projector shown in FIGS. 1A and 1B. The functional units of an electronic circuit of the projector are basically the same as those of the electronic circuit shown in FIG. 2. The same components are denoted by the same reference numerals and their drawings and descriptions are omitted.

Figure 4:
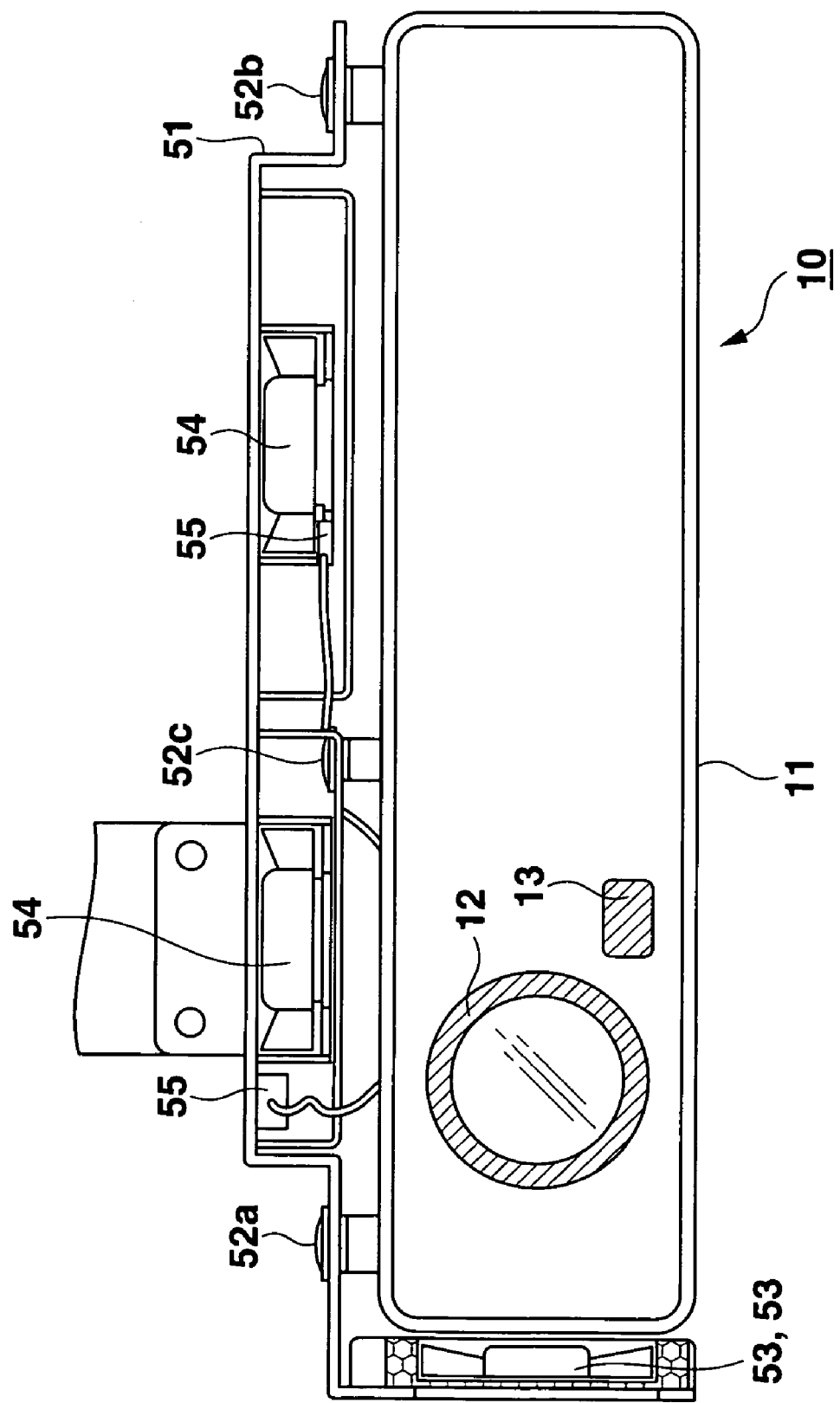
FIG. 4 is a front view of a projector according to a second embodiment of the present invention, which is mounted on ceiling hanging hardware.

FIG. 4 shows a projector 10 that is mounted on ceiling hanging hardware for fixing the projector on a ceiling or the like. Referring to FIG. 4, a bracket 51 is the principal component of the ceiling hanging hardware and has a virtually L-shaped section so as to match the bottom and left side of the projector 10. As is apparent from FIG. 4, the projector 10 is fixed top side down with the bottom having air hole 11c opposed to the ceiling.

When the projector 10 is mounted on the bracket 51, fixed-length metal fittings 52a to 52c are used in place of the length-adjustable legs 20a to 20c of the bottom of the projector 10. Specifically, the metal fittings 52a to 52c are each formed of a countersunk screw and a cylindrical spacer. The countersunk screw is inserted into a through hole (not shown) formed in the bracket 51 from the opposite side of the fixing side of the projector 10. The countersunk screw is then fitted and fastened into a screw hole for each of the length-adjustable legs 20a to 20c through the cylindrical spacer. The projector 10 is therefore firmly supported by the bracket 51.

The structure of a base for fixing the bracket 51 on a ceiling or the like and the structure of a rotating mechanism, which is attached integrally with the bracket 51, for connecting the base and the bracket 51 and controlling the projection direction of the projector 10, are the same as that of commonly-used ceiling hanging hardware; therefore, their drawings and descriptions are omitted.

External cooling fans 53, 53 and 54, 54 are provided opposite to the air holes 11b and 11c, respectively. These external cooling fans are arranged close to and opposite to the cooling fans 38 (not shown in FIG. 4) with the air holes 11b and 11c interposed therebetween. The external cooling fans are so arranged that their intake and outlet directions coincide with those of the cooling fans 38.

In the second embodiment, two of the cooling fans 38, which are provided on the left side of the casing 11, and their opposed external cooling fans 53 and 53 serve as intake fans for introducing cooled air into the projector 10. The other cooling fans 38, which are provided on the bottom of the casing 11, and their opposed external cooling fans 54 and 54 serve as exhaust fans for exhausting cooled air from inside the projector 10.

Temperature sensors 55 and 55 are provided close to their respective external cooling fans 54 and 54 serving as exhaust fans. The sensing signals of the temperature sensors 55 and 55 are sent out to the external fan control unit 35 via the external fan connection unit 19.

With the above configuration, the external fan control unit 35 repeatedly determines whether the temperatures sensed by the temperature sensors 55 and 55 are higher than a preset threshold value to thereby monitor the temperature of exhausted air. When the external fan control unit 35 determines that at least one of the sensed temperatures is higher than the preset threshold value, it turns on the external cooling fans 53, 53 and 54, 54 to promote the cooling operation of the cooling fans 38 in the projector 10. At the same time, the external fan control unit 35 stands by until the temperatures sensed by the temperature sensors 55 and 55 become not higher than the preset threshold value.

As the external cooling fans 53, 53 and 54, 54 operate, the inside of the projector 10 is urged to be cooled, and the temperature of exhausted air becomes not higher than the above threshold value. The external fan control unit 35 determines it by the temperatures sensed by the temperature sensors 55 and 55 to stop the external cooling fans 53, 53 and 54, 54 and stand by until the sensed temperatures exceed the threshold value again.

As described above, using information of temperature sensed by the temperature sensors 55 and 55 provided close to the external cooling fans 54 and 54 on the outlet side, the operations of the external cooling fans 53, 53 and 54, 54 are finely controlled and operated under required conditions. Thus, the external cooling fans 53, 53 and 54, 54 can be prevented from undesirably operating to reduce noise.

Third Embodiment

A projector according to a third embodiment of the present invention will be described with reference to FIG. 5.

The outward appearance of the projector is basically the same as that of the projector shown in FIGS. 1A and 1B. The functional units of an electronic circuit of the projector are basically the same as those of the electronic circuit shown in FIG. 2. The same components are denoted by the same reference numerals and their drawings and descriptions are omitted.

Figure 5:
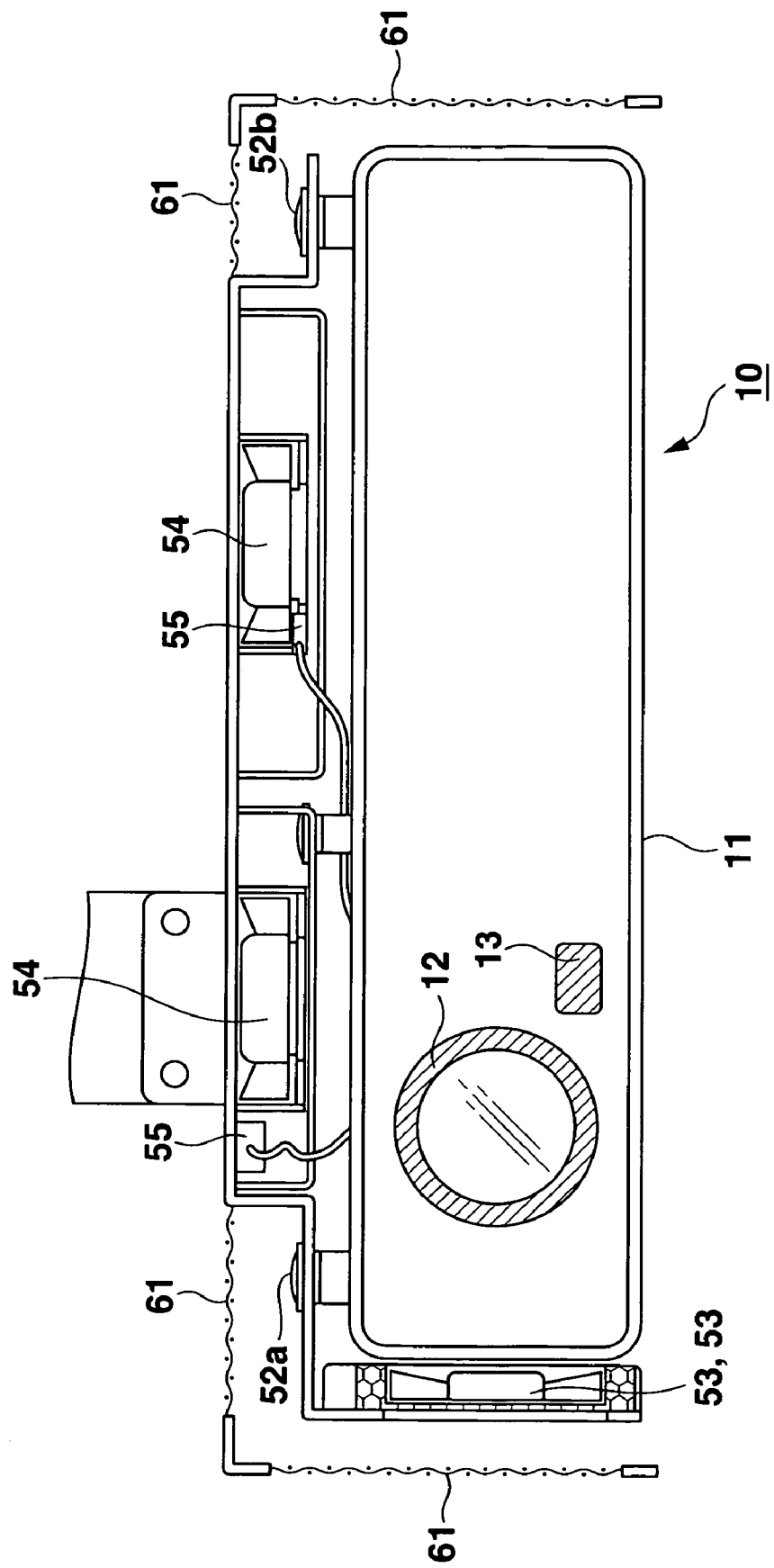
FIG. 5 is a front view of a projector according to a third embodiment of the present invention, which is mounted on ceiling hanging hardware.

FIG. 5 shows a projector 10 that is mounted on ceiling hanging hardware for fixing the projector on a ceiling or the like. In the third embodiment, too, a bracket 51 is the principal component of the ceiling hanging hardware. Since the shape and mounting method of the bracket 51 differs from that of the bracket of the second embodiment shown in FIG. 4, the same components are denoted by the same reference numerals and their detailed descriptions are omitted.

As shown in FIG. 5, a mesh cover 61 having a U-shaped section is formed using part of the top surface of the bracket, which corresponds to the bottom of the projector 10. The mesh cover 61 covers the entire bottom of the projector 10 and the right and left sides thereof and, in this case, the entire bottom corresponds to the top of the projector 10 when the projector 10 is fixed on the ceiling.

The corner and end portions of the mesh cover 61 are formed of reinforcing metal and the other portions are formed of very fine metal meshes. The mesh cover 61 serves as a dust filter to prevent dust from entering the air holes 11a to 11c of the projector 10 or prevent the air holes from being clogged with dust. Thus, the projector 10 can easily be cleaned even after it is fixed on the ceiling.

The above configuration prevents dust from being directly attached to the bottom of the projector 10, which corresponds to the top of the projector 10 when it is fixed on the ceiling, or prevents the air holes 11a to 11c from being clogged with dust. Consequently, the projector 10 can continuously be cooled with reliability.

The present invention is not limited to the shape or material of the mesh cover 61 in the third embodiment. The mesh cover has only to cover at least the top surface of the projector 10 when it is fixed on the ceiling. If the mesh cover 61 covers both sides of the projector 10, which have air holes 11a and 11b, as well as the top surface thereof, it can bring an advantage more reliably as a dust filter.

In all of the first to third embodiments, the projection apparatus is fixed on the ceiling of a room. The present invention is not limited to this. The projector can be fixed on the wall of a room.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a main unit including an internal cooling fan which cools an inside of a casing of the main unit through an air hole provided in the casing; and
   ceiling hanging hardware having an external cooling fan which faces the air hole provided in the casing of the main unit and whose airflow coincides with an airflow of the internal cooling fan through the air hole provided in the casing of the main unit,
   wherein the main unit is mountable on the ceiling hanging hardware so as to hang from the ceiling hanging hardware.

2. The projection apparatus according to claim 1, wherein an operation of the external cooling fan of the ceiling hanging hardware is controlled by a signal supplied from the main unit.

3. The projection apparatus according to claim 2, wherein the external cooling fan of the ceiling hanging hardware is operated in association with the internal cooling fan provided in the casing of the main unit.

4. The projection apparatus according to claim 1, wherein the ceiling hanging hardware comprises a temperature sensor that faces the air hole provided in the casing of the main unit, and wherein the air hole serves as an air outlet.

5. The projection apparatus according to claim 1, wherein the ceiling hanging hardware comprises a mesh cover that covers at least a top surface of the main unit when the main unit is mounted on the ceiling hanging hardware to hang from the ceiling hanging hardware.

6. Ceiling hanging hardware for a projection apparatus including an internal cooling fan which cools an inside of a main unit of the projection apparatus through an air hole provided in the main unit of the projection apparatus, the ceiling hanging hardware comprising:
   an external cooling fan which faces the air hole provided in the casing of the main unit and whose airflow coincides with an airflow of the internal cooling fan through the air hole provided in the casing of the main unit,
   wherein the main unit is mountable on the ceiling hanging hardware so as to hang from the ceiling hanging hardware.

7. A method of controlling an operation of a projection apparatus, wherein the projection apparatus comprises: (i) a main unit including an internal cooling fan which cools an inside of a casing of the main unit through an air hole provided in the casing, and (ii) ceiling hanging hardware having an external cooling fan which faces the air hole provided in the casing of the main unit and whose airflow coincides with an airflow of the internal cooling fan through the air hole provided in the casing of the main unit, wherein the main unit is mountable on the ceiling hanging hardware so as to hang from the ceiling hanging hardware, said method comprising:
   controlling an operation of the external cooling fan of the ceiling hanging hardware by a signal supplied from the main unit.

* * * * *